(12) United States Patent
Pan et al.

(10) Patent No.: US 12,205,164 B2
(45) Date of Patent: Jan. 21, 2025

(54) MACHINE LEARNING MODELS FOR QUALITATIVE DOMAINS

(71) Applicant: 2GenPen LLC, Morristown, NJ (US)

(72) Inventors: Bailu Pan, New York, NY (US); Laurence H. Wadler, Morristown, NJ (US)

(73) Assignee: 2GENPEN LLC, Morristown, NJ (US)

(*) Notice: Subject to any disclaimer, the term of this patent is extended or adjusted under 35 U.S.C. 154(b) by 0 days.

(21) Appl. No.: 18/733,186

(22) Filed: Jun. 4, 2024

(65) Prior Publication Data

US 2024/0403954 A1    Dec. 5, 2024

Related U.S. Application Data

(60) Provisional application No. 63/506,186, filed on Jun. 5, 2023.

(51) Int. Cl.
*G06Q 40/00*    (2023.01)
*G06N 20/00*    (2019.01)
*G06Q 40/03*    (2023.01)

(52) U.S. Cl.
CPC ............. *G06Q 40/03* (2023.01); *G06N 20/00* (2019.01)

(58) Field of Classification Search
CPC .............................. G06Q 40/03; G06N 20/00
USPC ........ 705/39, 37, 38, 40; 709/226, 201, 227; 701/425
See application file for complete search history.

(56) References Cited

U.S. PATENT DOCUMENTS

| | | | |
|---|---|---|---|
| 10,685,310 B1* | 6/2020 | McCuiston | G06Q 10/0637 |
| 11,068,947 B2* | 7/2021 | Shoshan | G06N 20/00 |
| 11,475,493 B2* | 10/2022 | Acharya | G06N 5/022 |
| 11,755,950 B2* | 9/2023 | Goyal | G06F 18/24 706/12 |
| 12,008,472 B2* | 6/2024 | Cook | G06N 7/01 |
| 12,100,048 B1* | 9/2024 | Arnott | G06Q 40/12 |
| 2013/0024395 A1* | 1/2013 | Clark | G06Q 40/06 705/36 R |
| 2017/0161758 A1* | 6/2017 | Towriss | G06Q 30/0201 |
| 2018/0040064 A1* | 2/2018 | Grigg | H04L 41/145 |

(Continued)

OTHER PUBLICATIONS

Machine Learning and Financial Planning; IEEE Potentials (vol. 36, Issue: 6, 2017, pp. 8-13); John M. Mulvey; Nov. 1, 2017. (Year: 2017).*

(Continued)

*Primary Examiner* — Tien C Nguyen
(74) *Attorney, Agent, or Firm* — ROSSI, KIMMS & McDOWELL LLP

(57) ABSTRACT

Systems and methods of generating rating indicators for a portfolio of financial assets are described. A machine learning model is trained using a training data set that includes one or more qualitative features and one or more first quantitative features to generate an output predictor of the performance of the portfolio. The qualitative features are converted into quantitative features before being used as input to the machine learning model. Input features are generated for a new portfolio of financial assets whose rating indicator is to be generated, and fed into the trained machine learning model to generate a new output predictor for the new portfolio of financial assets. The rating indicator for the new portfolio of financial assets is determined based at least on the generated new output predictor.

10 Claims, 5 Drawing Sheets

(56) References Cited

U.S. PATENT DOCUMENTS

| | | | | |
|---|---|---|---|---|
| 2018/0047071 A1* | 2/2018 | Hsu | .................... | G06Q 30/0282 |
| 2019/0147371 A1* | 5/2019 | Deo | ...................... | G06N 20/20 |
| | | | | 706/12 |
| 2019/0325524 A1* | 10/2019 | Gebara | ................... | G06Q 40/06 |
| 2022/0309475 A1* | 9/2022 | Kurniawan | ............ | G06F 16/248 |

OTHER PUBLICATIONS

Financial risk modelling in vehicle credit portfolio; 2014 International Conference on Data Mining and Intelligent Computing (ICDMIC) (2014, pp. 1-7); U. Bhuvaneswari, P. James Daniel Paul, Siddhant Sahu; Sep. 5, 2014. (Year: 2014).*

Wadler. "The Municipal Finance Opportunity Cost Index", Municipal Finance Journal. 1993. pp. 1-24, vol. 14 No. 3.

Wadler. "The Art of Structured Finance", The Linear Press. 1995. Excerpts of relevant pages.

Wadler. "Toward a New Financial Architecture", Municipal Finance Journal. 2009. pp. 1-48, vol. 30, No. 2.

Kroll Bond Rating Agency. "CMBS Single Borrower & Large Loan Rating Methodology", 2015. pp. 1-24.

KBRA. "Structured Credit Global Rating Methodology", 2020. pp. 1-21.

FitchRatings. "The Annual Manual, U.S. Leveraged Finance Primer", 2017 pp. 1-190.

Wadler. "The Impact of Lending Velocity on Revolving Fund Performance", Municipal Finance Journal. 1995. pp. 1-31, vol. 16, No. 1.

\* cited by examiner

MACHINE LEARNING MODELS FOR QUALITATIVE DOMAINS

TECHNICAL FIELD

The present invention is generally related to the field of generating machine learning models that can learn more nuanced patterns captured in qualitative features and generate more accurate predictions using both quantitative and qualitative features.

BACKGROUND

Machine learning (ML) identifies patterns in feature data (input) to predict future outcomes (output) using a model that represents the relationships between the input and the output. The success of ML hinges on feature engineering, where relevant data characteristics in the input are transformed into quantifiable features. When predicting credit ratings for a portfolio of bonds and stocks, analysts traditionally leverage features like historical price movements, debt-to-equity ratios for companies issuing bonds, and dividend payouts. These features provide a numerical snapshot of a security's financial health, allowing ML models to learn patterns that differentiate investment-grade securities from riskier ones. The ML models then learn functions that map these features to the desired output, such as a rating (e.g., AAA, BBB-, etc.) issued by a credit rating agency (CRA).

However, the financial world is not solely driven by objective factors. Subjective elements, influenced by investor sentiment and market psychology, can significantly impact credit ratings. The municipal securities market is a crucial component of the global financial system, enabling governments and other municipal entities to raise capital by issuing debt securities. Bond ratings are essential for investors to assess the creditworthiness and risk level of bond offerings. Traditionally, bond ratings are assigned by credit rating agencies (CRAs), such as Standard & Poor's, Moody's, and Fitch Ratings, based on a variety of factors, including the issuer's financial strength, debt repayment history, and market conditions. These ratings provide investors with an indication of the rating agencies assessment of the probability that the debt issuer will default on its financial obligations. However, traditional bond rating methodologies as applied within different categories of financial securities (such categories of securities, "asset classes") are demonstrably subjective, biased, and slow to adapt to changing market conditions.

Conventional ML models struggle with subjective data for several reasons. Firstly, subjectivity is inherently difficult to quantify. Capturing the market's "risk appetite" into a model is challenging, as it reflects factors like current economic conditions and recent news events, which are not easily translated into numerical features. Secondly, subjective data is highly contextual. A sudden surge in negative news about a specific industry, for instance, might trigger a wave of investor sell-offs, even if the underlying fundamentals of individual companies within that industry remain strong. The model, lacking the ability to understand context, might misinterpret such subjective information and downgrade credit ratings across the board. Finally, subjectivity can be ambiguous and open to interpretation. A central bank's decision to raise interest rates could be perceived as a sign of a healthy economy or a potential precursor to a recession, depending on investor sentiment. Conventional models struggle to capture these nuances, leading to potentially inaccurate credit ratings.

These limitations become particularly significant in financial portfolio risk assessment, where assessing the probability of default is influenced by both objective factors (creditworthiness, market conditions) and subjective factors (investor sentiment, risk tolerance). A sudden surge of negative news about a company, for instance, might trigger investor panic selling despite the company's strong financials. Solely relying on objective features can lead to an overestimation or underestimation of risk during periods of heightened investor panic or periods of irrational exuberance. Conventional models, blind to this subjective element, might underestimate the default risk of that security. Additionally, the financial domain is rife with subjective terminology ("bullish," "bearish," "hot sectors") that poses interpretation challenges for models. This can have significant consequences for portfolio managers who may be misled into holding onto riskier assets or missing out on potentially profitable opportunities. As a result, relying solely on conventional ML techniques can lead to inaccurate credit ratings, potentially jeopardizing investment decisions.

While conventional ML models excel at leveraging objective data for credit rating prediction, their limitations become apparent when dealing with subjective factors. The inherent difficulty of quantifying subjectivity, its context-dependence, and its ambiguity, all contribute to potentially inaccurate predictions. In the critical domain of financial risk assessment, the presence of subjective factors like investor sentiment significantly impacts the accuracy of default risk predictions made by conventional models. Thus, there is a need for novel and inventive ML techniques that can better handle subjective data to make more robust and reliable predictions across various domains.

SUMMARY

Machine learning techniques, such as neural networks, can generate more accurate and objective evaluation of relative default risk across asset classes. Neural networks are computational models inspired by the structure and function of the human brain, capable of learning complex patterns and making predictions based on input data. By incorporating both quantitative and qualitative features into the input data, neural networks can learn more nuanced patterns and generate more accurate ratings.

However, despite the potential benefits of neural networks in bond rating applications, there are several challenges to their implementation. One of the main challenges is the need for high-quality input data, which may be difficult to obtain or may require significant preprocessing. Additionally, neural networks are typically "black box" models, meaning that it can be difficult to interpret how the model arrived at its predictions. This can be a concern for regulatory and compliance purposes, as well as for investors who want to understand the basis for the ratings.

At least the above-discussed need is addressed and technical solutions are achieved in the art by various embodiments of the present invention. Some embodiments of the present invention pertain to methods and systems for training a machine learning model to evaluate the relative default risk of a financial bond offering using both qualitative and quantitative features. The method involves preprocessing input data to extract both qualitative and quantitative features, converting qualitative features into numerical representations, and combining the resulting features into a single feature vector. The machine learning model is then trained on this feature vector to generate relative default probabilities across asset classes which can then be equated to comparable bond ratings. The system includes a data preprocessing module, a feature extraction module, and a machine learning module.

In some embodiments of the invention, a method of generating a rating indicator comprises acquiring a training data set including a plurality of training samples, each training sample of the plurality of training samples defining a portfolio of financial assets and including a plurality of input features and an output predictor of the performance of the portfolio of financial assets, the plurality of input features including one or more qualitative features and one or more first quantitative features; converting the one or more qualitative features into one or more second quantitative features; training a machine learning model using the one or more first quantitative features, the one or more second quantitative features, and the output predictor for each training sample; receiving a new portfolio of financial assets whose rating indicator is to be generated; generating a new plurality of input features for the new portfolio of financial assets, the new plurality of input features including one or more new qualitative features and one or more new first quantitative features; converting the one or more new qualitative features into one or more new second quantitative features; inputting the one or more new first quantitative features and the one or more new second quantitative features into the trained machine learning model to generate a new output predictor for the new portfolio of financial assets; and generating the rating indicator for the new portfolio of financial assets based at least on the generated new output predictor.

In some embodiments of the invention, the one or more first quantitative features and the one or more second quantitative features are combined into an input feature vector for training the machine learning model.

In some embodiments of the invention, each training sample includes a plurality of input feature vectors, each feature vector being associated with one financial asset of the portfolio of financial assets; the machine learning model is a two-stage model including a plurality of first stage models corresponding to the plurality of input feature vectors and one second stage model; each first stage model of the plurality of first stage models is trained using a corresponding input feature vector of the plurality of input feature vectors as input to generate one or more outputs; and the second stage model uses, as input, the one or more outputs from each of the first stage models and generates, as output, the output predictor for each training sample.

In some embodiments of the invention, the number of the plurality of first stage models in the two-stage model is variable and has a one-to-one correspondence to the number of financial assets in the portfolio of financial assets. In some embodiments of the invention, the number of inputs to the one second stage model in the two-stage model is variable and has a one-to-one correspondence to the number of financial assets in the portfolio of financial assets. In some embodiments of the invention, the two-stage model is a dynamic neural network model.

In some embodiments of the invention, the rating indicator defines a probability of a risk of default. In some embodiments of the invention, the rating indicator is a ratio of a probability of a risk of default of a municipal securities asset class to a risk of default of a comparable collateralized loan obligation asset class.

In some embodiments of the invention, the portfolio of financial assets includes both municipal financial assets and commercial financial assets.

In some embodiments of the invention, the method further includes iteratively changing one or more financial assets in the portfolio of financial assets, updating the new plurality of input features, and generating the rating indicator until a target rating indicator is obtained.

In some embodiments of the invention, a database processing system comprises an input-output device system communicatively connected to a display device system, a memory device system storing a program, and a data processing device system communicatively connected to the input-output device system and the memory device system, the data processing device system configured at least by the program at least to execute the methods of the various embodiments discussed above.

In some embodiments of the invention, a non-transitory computer-readable storage medium is configured to store a program that, when executed by a data processing device system, performs the methods of the various embodiments discussed above.

In some embodiments of the invention, a method of determining relative default probability across a plurality of asset classes includes generating credit rating agency (CRA) metrics for a first asset class and objectively applying the generated CRA metrics to a second asset class using a plurality of qualitative and quantitative factors as input features into a trained machine learning model.

In some embodiments of the invention, the first asset class is collateralized loan obligations (CLO) and the second asset class is municipal securities, and the generated CRA metrics for the CLO asset class are used as the basis for evaluating the relative default risk of securities issued within the municipal securities asset class.

In some embodiments of the invention, the trained machine learning models provides an objective ratio of the default risk of a municipal securities asset class to the default risk of a CLO asset class using a Municipal Securities Equalization Quotient (MUseQ®).

In some embodiments of the invention, the method further comprises training the machine learning model to standardize the evaluation metrics for assessing securities across a plurality of asset classes. The trained model is applicable to asset classes in both the corporate market and the municipal market. In some embodiments, the trained model also considers pertinent regulatory and industry guidelines as input features.

In some embodiments of the invention, the trained machine learning model eliminates human bias through assessing default risks crossing different assets classes and markets, thereby ensuring a more objective and unbiased assessment process.

In some embodiments of the invention, the trained model further uses analytical techniques such as Monte Carlo simulation to analyze and compare default risk factors across a wide array of asset categories, encompassing but not limited to stocks, bonds, derivatives, commodities, and foreign exchange. By encompassing a broad spectrum of financial instruments and market segments, the model aims to enhance the accuracy, consistency, and fairness of default risk evaluations, enabling more informed decision-making and fostering greater confidence in risk management practices across the financial industry.

BRIEF DESCRIPTION OF THE DRAWINGS

It is to be understood that the attached drawings are for purposes of illustrating aspects of various embodiments

DETAILED DESCRIPTION

Figure 1:
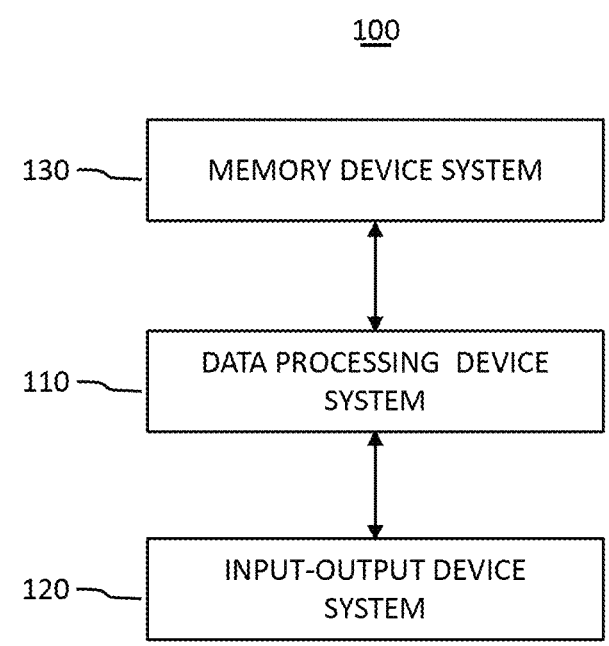
FIG. 1 shows a computing device system, according to some embodiments of the invention.

Conventionally, a credit rating agency (CRA) assesses the creditworthiness of a corporate (or commercial entity) bond by analyzing various factors related to the issuer, the bond's features, and the market conditions. The process involves several steps, including (1) gathering information, (2) assessing the credit risk, and (3) assigning a credit rating.

In the gathering information step, the CRA collects relevant data about the bond issuer, such as its financial statements, industry outlook, management quality, and business prospects. The CRA also analyzes the bond's terms, such as its coupon rate, maturity, collateral, and covenants.

In the assessing the credit risk step, the CRA evaluates the likelihood of the issuer defaulting on the bond, which involves analyzing its ability and willingness to repay the debt. The CRA considers factors such as the issuer's financial strength, debt-to-equity ratio, cash flow generation, liquidity, and debt service coverage ratio. The CRA also evaluates the macroeconomic environment, interest rate trends, and regulatory factors that may affect the issuer's creditworthiness.

In the assigning a credit rating step, based on its analysis, the CRA assigns a credit rating to the bond, which reflects the agency's assessment of the bond's credit risk. Depending on each CRA's rating scale, the rating may range from AAA (highest credit quality) to D (in default). The rating provides an independent opinion to investors about the bond's creditworthiness, which affects its marketability and pricing.

Overall, the credit rating agency's goal is to provide investors with an unbiased and reliable assessment of the bond's credit risk, which helps them make informed investment decisions. When rating a municipal bond, a CRA generally assesses the creditworthiness of a municipality or other local government entity (issuer) by considering various factors such as financial strength, economics and demographics, debt profile, and management and governance.

The financial strength of a municipal issuer is determined by reviewing the municipal issuer's financial statements, budget, and cash flow projections, to assess its ability to meet its debt obligations. The local economy and demographics of the municipal issuer's jurisdiction can impact the municipal issuer's ability to generate revenue and repay its debts. The CRA will also review the municipal issuer's outstanding debt and its repayment history, including the maturity schedule and any covenants or restrictions on the issuer's ability to incur additional debt. Finally, the CRA may evaluate the quality of the issuer's management team and its governance structure to assess the likelihood of default.

Conventionally, the CRAs represent that the default risk, as reflected in their bond ratings, are comparable across asset classes. In practice, however, the risk profile of an "A" rated sales tax credit of a major city, for instance, can be demonstrated to be lower than the risk profile of an "A" rated tranche of a typical commercial bond securitization. A CLO, for instance, is an example of a securitization wherein a pool of distinct corporate bonds serve as collateral for a series of debt tranches sold to investors. One reason for such discrepancy is that CRA ratings of the risk of default, by their very nature and methodology, are inconsistent across asset classes. Furthermore, traditional bond rating methodologies are demonstrably inconsistent when applied across asset classes, which results in flawed assessments of relative default risk despite the CRAs representation that, for example, an "A" rated corporate bond necessarily has a probability of default equivalent to an "A" rated municipal bond.

To adequately account for the reduced risk posed by municipal issuers, and properly rate a financial offering from a municipal issuer, various qualitative and quantitative factors need to be combined in an objective manner, and eliminate intrinsic human bias.

In some embodiments, the systems described herein execute methods for generating objective rating models for municipal securities using machine learning. It should be noted that the invention is not limited to these or any other examples provided herein, which are referred to for purposes of illustration only. Moreover, the inventions described herein do not merely implement the traditional human-centric manual modeling approaches in a computerized system. Rather, the machine learning based systems presented herein describe completely novel and inventive approaches to determining a CRA rating (risk of default) in a manner which would be impossible for a human modeler to achieve.

For example, the traditional approach to determining a CRA rating for a mix of assets in a portfolio requires a financial expert to manually evaluate each component asset of the mix of assets separately, and as a whole. However, this manual approach has several challenges that go beyond mere efficiency and accuracy gains made by using computers to do the modeling in the same way as humans do. Human beings rely on their understanding of each financial asset, and the patterns (factors and considerations) they can observe and understand in the data, to model the risk of default. Human judgment also introduces subjectivity into the evaluation process, leading to variations in the resulting CRA ratings. Different analysts would rate the same financial asset differently, based on their own subjective biases, interests, and limited knowledge, resulting in biased scores.

The problems are even greater when the financial analyst is tasked with constructing a portfolio (mix of assets) having a target risk of default (desired CRA rating). Conventionally, assessing the relative risk of default (such as, for example, defined by an AAA rating by a CRA) for a bond portfolio involves manually iterating between asset selection and statistical modeling of the mix of financial assets to try and get to the desired rating. In the asset selection phase, experienced financial analysts handpick different types of financial assets (bonds, stocks etc.) based on their knowledge, market conditions, and financial data. However, these selections are limited to what the analysts are familiar with. For example, analysts working in the corporate market would not select municipal bonds for their portfolio because the investment regime is totally different and these analysts have little to no ability to understand municipal factors such as tax code, legislation, socio-economic conditions, etc. that effect the risk of default when municipal bonds are included in the portfolio. In the statistical modeling phase, the analysts input bond characteristics (such as sectors, credit ratings, yields, and maturities) into statistical tools (such as Excel spreadsheets) to estimate portfolio risk and return. The iteratively nature of the process permits the analyst to make some changes to the mix of assets to try and achieve the desired rating.

Human judgment also introduces subjectivity into the modeling process, leading to variations in bond selection and portfolio construction. Different analysts would rate the same financial asset differently, based on their own subjective biases, interests, and limited knowledge. Further, it is impossible for a human analyst to understand every market condition, industry sector, tax code differences, etc. Thus, each analyst would be very limited in the set of financial assets from which they make their selection when constructing a portfolio with a desired target risk of default. Not only is it extremely time-intensive to evaluate various portfolios drawn from potentially thousands of possible selections, but the evaluation is also highly prone to errors. Moreover, the evaluation process is limited to only the readily observable patterns in the data. Current CRA methodologies for evaluating securities are disconnected and the methods, systems, and technologies described in this application represent a new approach to evaluating default risk that unifies credit metrics across asset classes.

The machine learning based systems presented herein provide specific technical improvements in the risk modeling technology by leveraging the ability of the machine learning models to discover unobserved relationships between the various factors to model the risk of default. The machine learning based CRA rating models provide a more intricate analysis of data, using information that may seem unconventional or inaccessible to a human analyst or that goes beyond the scope of conventional CRA rating metrics. Machine learning can generate models that utilize a comprehensive set of complex rules, in contrast to the simplistic rules employed by human analysts, to more accurately assess the risk of default for a portfolio of assets. Furthermore, the machine learning models can continuously update and refine the risk of default for a given portfolio of assets by considering new data to continually evaluate the model. Such a feature is characteristically absent in conventional credit rating technology because the data could be stale (and potentially incorrect) by the time a human analyst would be able to properly understand and adjust the changing risk of default. For example, the credit risk modeling methods and system presented herein would be able to react in real time to changes in the price of various stocks or bonds in the market exchanges, provide a continuous update to the current risk of default. This is in sharp contrast to current risk modeling technology, where the analysis is performed very infrequently, often months apart. The real time evaluation of the risk of default, based on current market fluctuations in the price of various assets in the portfolio, permits the portfolio manager to react instantaneously to adjust the mix of assets to maintain the target CRA rating.

In this regard, the systems and methods described herein provide several technical improvements in the field of risk modeling for a financial portfolio. The systems and methods described herein can (1) process large datasets quickly, allowing for faster decision-making; (2) optimize portfolios with precision by considering multiple variables simultaneously; (3) handle diverse portfolios with ease; (4) adapt to changing market conditions in real time and adjust portfolios accordingly; (5) minimize human bias (which played a vital part in the 2008 financial crisis, where financial institutions built up large mortgage-backed securities (MBS) and collateralized debt obligations (CDOs) portfolios but grossly underestimated the risk of default due to overconfidence and herd mentality, which led to massive financial losses); and (6) analyze the relative default risk across different asset classes (such as municipal and commercial), which has not been done before.

The systems and methods described herein automate and optimize financial portfolio evaluation and provide substantial technical improvements in risk modeling technology by minimizing subjectivity (human bias) and enhancing accuracy, thereby empowering both issuers and investors to make more informed decisions. By combining data-driven insights, compliance monitoring, and customized responses, the systems and methods described herein enhance the stability of and reduce the systemic risks in financial portfolios.

In this regard, in the descriptions herein, certain specific details are set forth in order to provide a thorough understanding of various embodiments of the invention. However, one skilled in the art will understand that the invention may be practiced at a more general level without one or more of these details. In other instances, well-known structures have not been shown or described in detail to avoid unnecessarily obscuring descriptions of various embodiments of the invention.

Any reference throughout this specification to "one embodiment", "an embodiment", "an example embodiment", "an illustrated embodiment", "a particular embodiment", and the like means that a particular feature, structure or characteristic described in connection with the embodiment is included in at least one embodiment. Thus, any appearance of the phrase "in one embodiment", "in an embodiment", "in an example embodiment", "in this illustrated embodiment", "in this particular embodiment", or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects.

In the following description, some embodiments of the present invention may be implemented at least in part by a data processing device system configured by a software program. Such a program may equivalently be implemented as multiple programs, and some or all of such software program(s) may be equivalently constructed in hardware.

Further, the phrase "at least" is or may be used herein at times merely to emphasize the possibility that other elements may exist beside those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configured to A' includes a configuration to perform A, as well as the possibility of one or more other additional actions besides A. However, the phrase, 'configured only to A' means a configuration to perform only A.

The word "device", the word "machine", the word "system", and the phrase "device system" all are intended to include one or more physical devices or sub-devices (e.g., pieces of equipment) that interact to perform one or more functions, regardless of whether such devices or sub-devices are located within a same housing or different housings. However, it may be explicitly specified according to various embodiments that a device or machine or device system resides entirely within a same housing to exclude embodiments where the respective device, machine, system, or device system resides across different housings. The word "device" may equivalently be referred to as a "device system" in some embodiments.

The phrase "derivative thereof" and the like is or may be used herein at times in the context of a derivative of data or information merely to emphasize the possibility that such data or information may be modified or subject to one or more operations. For example, if a device generates first data for display, the process of converting the generated first data into a format capable of being displayed may alter the first data. This altered form of the first data may be considered a derivative of the first data. For instance, the first data may be a one-dimensional array of numbers, but the display of the first data may be a color-coded bar chart representing the numbers in the array. For another example, if the above-mentioned first data is transmitted over a network, the process of converting the first data into a format acceptable for network transmission or understanding by a receiving device may alter the first data. As before, this altered form of the first data may be considered a derivative of the first data. For yet another example, generated first data may undergo a mathematical operation, a scaling, or a combining with other data to generate other data that may be considered derived from the first data. In this regard, it can be seen that data is commonly changing in form or being combined with other data throughout its movement through one or more data processing device systems, and any reference to information or data herein is intended to include these and like changes, regardless of whether or not the phrase "derivative thereof" or the like is used in reference to the information or data, unless otherwise required by context. As indicated above, usage of the phrase "or a derivative thereof" or the like merely emphasizes the possibility of such changes. Accordingly, the addition of or deletion of the phrase "or a derivative thereof" or the like should have no impact on the interpretation of the respective data or information. For example, the above-discussed color-coded bar chart may be considered a derivative of the respective first data or may be considered the respective first data itself.

The term "program" in this disclosure should be interpreted to include one or more programs including as a set of instructions or modules that may be executed by one or more components in a system, such as a controller system or data processing device system, in order to cause the system to perform one or more operations. The set of instructions or modules may be stored by any kind of memory device, such as those described subsequently with respect to the memory device system 130, 151, or both, shown in FIGS. 1 and 2, respectively. In addition, this disclosure may describe or similarly describe that the instructions or modules of a program are configured to cause the performance of an action. The phrase "configured to" in this context is intended to include at least (a) instructions or modules that are presently in a form executable by one or more data processing devices to cause performance of the action (e.g., in the case where the instructions or modules are in a compiled and unencrypted form ready for execution), and (b) instructions or modules that are presently in a form not executable by the one or more data processing devices, but could be translated into the form executable by the one or more data processing devices to cause performance of the action (e.g., in the case where the instructions or modules are encrypted in a non-executable manner, but through performance of a decryption process, would be translated into a form ready for execution). Such descriptions should be deemed to be equivalent to describing that the instructions or modules are configured to cause the performance of the action. The word "module" may be defined as a set of instructions. The word "program" and the word "module" may each be interpreted to include multiple sub-programs or multiple sub-modules, respectively. In this regard, reference to a program or a module may be considered to refer to multiple programs or multiple modules.

Further, it is understood that information or data may be operated upon, manipulated, or converted into different forms as it moves through various devices or workflows. In this regard, unless otherwise explicitly noted or required by context, it is intended that any reference herein to information or data includes modifications to that information or data. For example, "data X" may be encrypted for transmission, and a reference to "data X" is intended to include both its encrypted and unencrypted forms, unless otherwise required or indicated by context. However, non-usage of the phrase "or a derivative thereof" or the like nonetheless includes derivatives or modifications of information or data just as usage of such a phrase does, as such a phrase, when used, is merely used for emphasis.

Further, the phrase "graphical representation" used herein is intended to include a visual representation presented via a display device system and may include computer-generated text, graphics, animations, or one or more combinations thereof, which may include one or more visual representations originally generated, at least in part, by an image-capture device.

Figure 3:
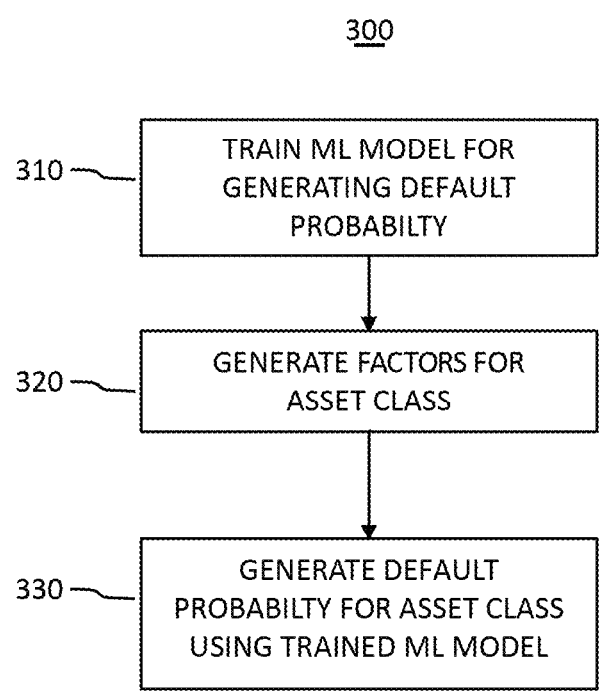
FIG. 3 shows a flowchart for a method of generating a relative default probability for an asset class based on another asset class, according to some embodiments of the present invention.
Figure 4:
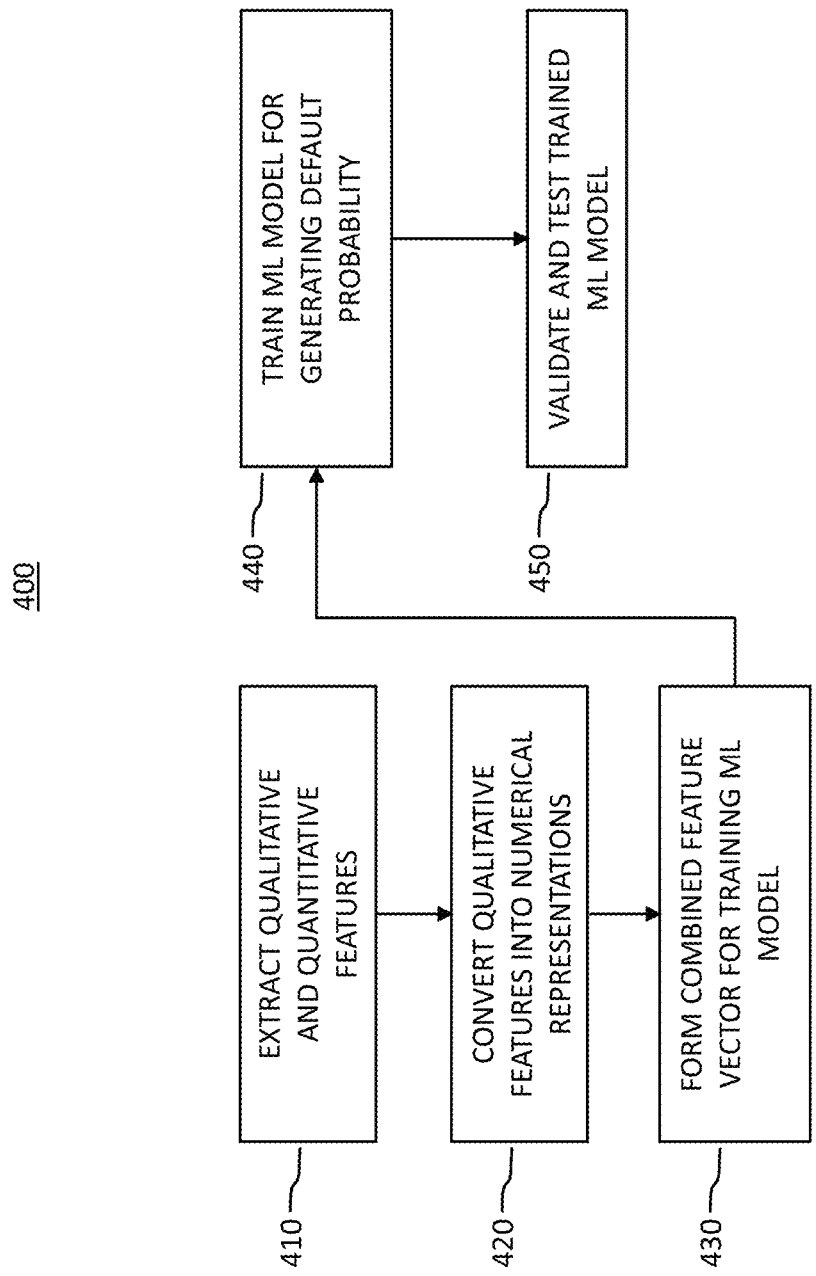
FIG. 4 shows a flowchart for a method of training a machine learning model for generating a default probability for an asset class, according to some embodiments of the present invention.

Further still, example methods are described herein with respect to FIGS. 3 and 4. Such figures are described to include blocks associated with computer-executable instructions. It should be noted that the respective instructions associated with any such blocks herein need not be separate instructions and may be combined with other instructions to form a combined instruction set. The same set of instructions may be associated with more than one block. In this regard, the block arrangement shown in method FIGS. 3 and 4 herein is not limited to an actual structure of any program or set of instructions or required ordering of method tasks, and such method FIGS. 3 and 4, according to some embodiments, merely illustrates the tasks that instructions are configured to perform, for example upon execution by a data processing device system in conjunction with interactions with one or more other devices or device systems.

Figure 2:
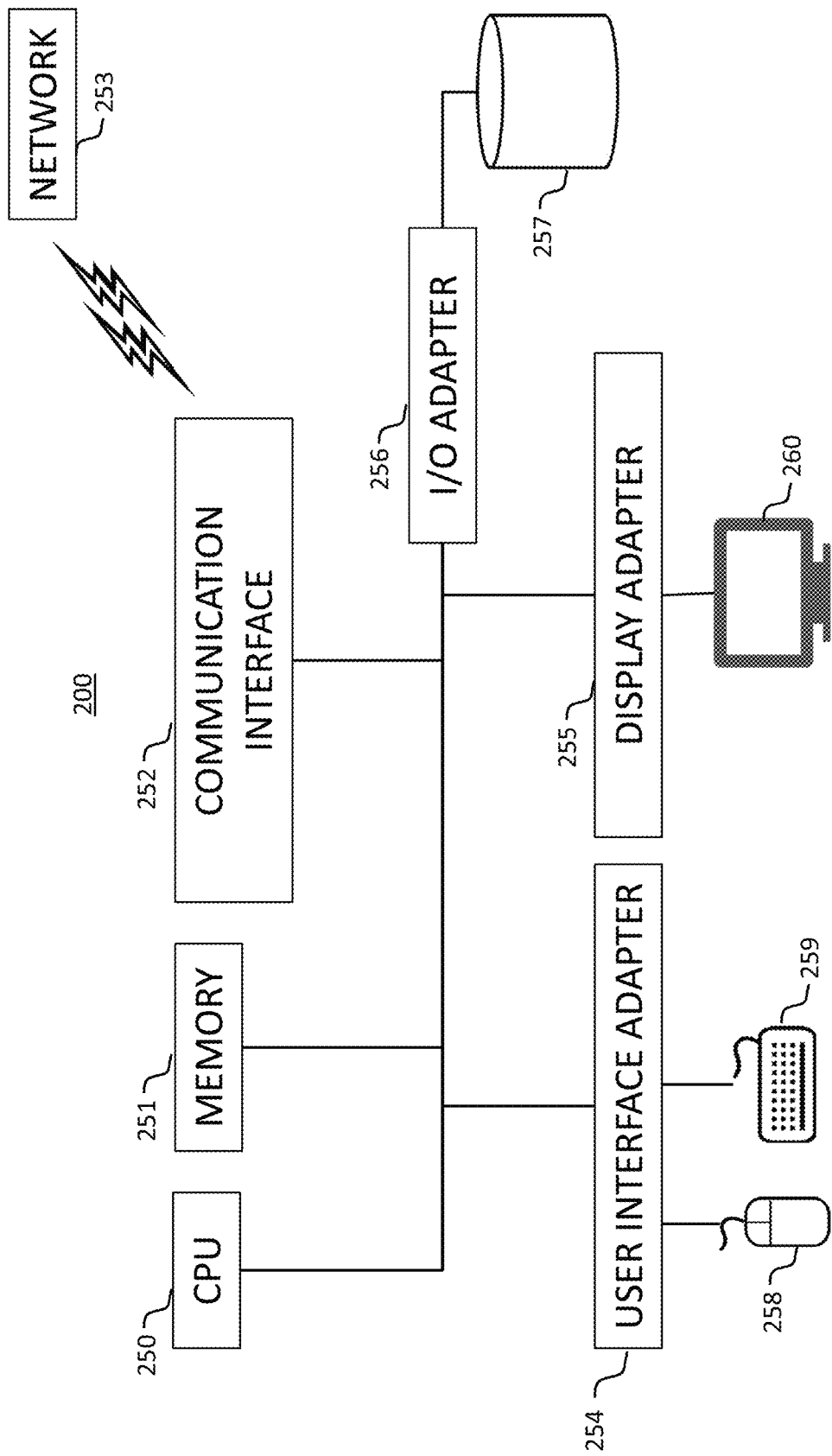
FIG. 2 shows another computing device system, according to some embodiments of the invention.

FIG. 1 schematically illustrates a system 100 according to some embodiments. In some embodiments, the system 100 may be a computing device 100 (as shown in FIG. 2). In some embodiments, the system 100 includes a data processing device system 110, an input-output device system 120, and a processor-accessible memory device system 130. The processor-accessible memory device system 130 and the input-output device system 120 are communicatively connected to the data processing device system 110.

The data processing device system 110 includes one or more data processing devices that implement or execute, in conjunction with other devices, such as one or more of those in the system 100, control programs associated with some of the various embodiments. Each of the phrases "data processing device", "data processor", "processor", and "computer" is intended to include any data processing device, such as a central processing unit ("CPU"), a desktop computer, a laptop computer, a mainframe computer, a tablet computer, a personal digital assistant, a cellular phone, and any other device configured to process data, manage data, or handle data, whether implemented with electrical, magnetic, optical, biological components, or other.

The memory device system 130 includes one or more processor-accessible memory devices configured to store information, including the information needed to execute the control programs associated with some of the various embodiments. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs (Read-Only Memory), and RAMs (Random Access Memory). In some embodiments, each of the phrases "processor-accessible memory" and "processor-accessible memory device" is intended to include a non-transitory computer-readable storage medium. In some embodiments, the memory device system 130 can be considered a non-transitory computer-readable storage medium system.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending upon the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 1 can be implemented by a single application-specific integrated circuit (ASIC) in some embodiments.

The input-output device system 120 may include a mouse, a keyboard, a touch screen, another computer, or any device or combination of devices from which a desired selection, desired information, instructions, or any other data is input to the data processing device system 110. The input-output device system 120 may include any suitable interface for receiving information, instructions or any data from other devices and systems described in various ones of the embodiments.

The input-output device system 120 also may include an image generating device system, a display device system, a speaker device system, a processor-accessible memory device system, or any device or combination of devices to which information, instructions, or any other data is output from the data processing device system 110. In this regard, if the input-output device system 120 includes a processor-accessible memory device, such memory device may or may not form part or all of the memory device system 130. The input-output device system 120 may include any suitable interface for outputting information, instructions or data to other devices and systems described in various ones of the embodiments. In this regard, the input-output device system may include various other devices or systems described in various embodiments.

FIG. 2 shows an example of a computing device system 200, according to some embodiments. The computing device system 200 may include a processor 250, corresponding to the data processing device system 110 of FIG. 1, in some embodiments. The memory 251, input/output (I/O) adapter 256, and non-transitory storage medium 257 may correspond to the memory device system 130 of FIG. 1, according to some embodiments. The user interface adapter 254, mouse 258, keyboard 259, display adapter 255, and display 260 may correspond to the input-output device system 120 of FIG. 1, according to some embodiments. The computing device 200 may also include a communication interface 252 that connects to a network 253 for communicating with other computing devices 200.

Various methods 300, 400 may be performed by way of associated computer-executable instructions according to some example embodiments. In various example embodiments, a memory device system (e.g., memory device system 130) is communicatively connected to a data processing device system (e.g., data processing device systems 110, otherwise stated herein as "e.g., 110") and stores a program executable by the data processing device system to cause the data processing device system to execute various embodiments of methods 300, 400 via interaction with at least, for example, various databases. In these various embodiments, the program may include instructions configured to perform, or cause to be performed, various ones of the instructions associated with execution of various embodiments of methods 300, 400. In some embodiments, methods 300, 400 may include a subset of the associated blocks or additional blocks than those shown in FIGS. 3 and 4. In some embodiments, methods 300, 400 may include a different sequence indicated between various ones of the associated blocks shown in FIGS. 3 and 4.

FIG. 3 is a high-level flowchart of a method 300 to generate a relative default probability for an asset class based on another asset class. In step 310, a model for obtaining a default probability for a first asset class, based on a set of input factors for the first asset class, is generated. In step 320, factors for obtaining the default probability for a second asset class are generated. In step 330, the default probability of the second asset class is generated by providing the factors for the second asset class to the model for obtaining the default probability for the first asset class.

FIG. 4 is a high-level flowchart of a method 400 to generate a machine learning model for objectively evaluating the relative default probability of an asset class (such as one or more corporate bonds or a portfolio of municipal securities) using both quantitative and qualitative features. In step 410, input data is preprocessed to extract both qualitative and quantitative features. The input data might include financial statements, news articles, and other sources of information relevant to the municipal security offering or the municipal issuer. Qualitative features might include textual descriptions of the issuer, governance and public policy trends, and geopolitical risks, while quantitative features might include financial ratios, credit ratings, and market data.

In step 420, the qualitative features are converted into numerical representations that can be fed into the neural network. For example, the text descriptions might be converted into a bag-of-words representation or an embedding representation, while categorical data might be one-hot encoded. In step 430, the resulting numerical representations are combined with the quantitative features into a single feature vector that can be fed into the machine learning model for training. The resulting feature vector might be normalized to ensure that all features are on the same scale. In step 440, a machine learning model is trained on the feature vector to generate relative levels of default probability. The machine learning model may be a neural network such as a deep neural network, a convolutional neural network, a recurrent neural network, or any other type of neural network, a support vector machine, etc. The training might involve supervised learning, unsupervised learning, or a combination of both. In step 450, the relative default probability generated by the trained machine learning model are evaluated for accuracy and reliability. This might involve comparing the default probability output generated by the machine learning model to the default probabilities (as reflected in the bond ratings) generated by traditional rating agencies (CRAs) or experts, or evaluating the trained model's performance on a holdout dataset.

Qualitative features that could be used to rate municipal offerings include (1) local economic conditions, (2) political and regulatory environment, (3) management quality, (4) economic diversity across industry sectors operating within the municipalities jurisdiction, (5) corporate diversity within those industry sectors, (6) environmental, social, and governance (ESG) factors, and (7) industry trends.

Often, municipal bonds are issued by state and local governments to finance public infrastructure projects, such as highways, bridges, schools, and hospitals. The economic conditions of the local area can have a significant impact on the issuer's ability to generate revenue from these projects and repay the bonds. Factors such as population growth, unemployment rates, and the strength of the local economy can all be considered as qualitative features when assessing the creditworthiness of municipal issuers.

The political and regulatory environment in which a municipal issuer operates can also be an important qualitative feature. Factors such as changes in tax laws, zoning regulations, and government policies can all have an impact on the issuer's ability to generate revenue and service its debt. For example, a municipality that relies heavily on a single industry for revenue may be more vulnerable to economic downturns or changes in regulatory policy than a municipality that has a diverse set of industries. The quality of the management team responsible for overseeing the municipal bond issuer can also be a qualitative feature used to assess creditworthiness. Factors such as experience, track record, and reputation can all be considered when evaluating the management team's ability to make sound financial decisions and navigate potential risks.

In recent years, there has been growing interest in incorporating environmental, social, and governance (ESG) factors, such as a company's carbon footprint, labor practices, and board diversity, into credit rating methodologies. Municipal issuers that prioritize ESG factors may be viewed as more sustainable and less risky than those that do not. Industry trends can also be an important qualitative feature when assessing the creditworthiness of municipal issuers. For example, if there is a trend toward increased investment in renewable energy projects, municipal issuers that are investing in such projects may be viewed as more innovative and forward-thinking than those that are not. Similarly, if there is a trend toward increased investment in public transportation infrastructure, municipal issuers that are investing in such projects may be viewed as better positioned to generate revenue and service their debt.

Converting qualitative features into inputs for training a machine learning model can be challenging because these features are often subjective and difficult to quantify. However, there are several techniques that can be used to convert qualitative features into quantitative inputs, including one-hot encoding, sentiment analysis, expert opinions, text mining, and principal component analysis, for example.

One-hot encoding is a technique for converting categorical variables into numerical data that can be used by a machine learning model. Each category is assigned a unique integer value, and a binary vector is created for each observation, with a value of 1 in the corresponding position for the category and 0s elsewhere. For example, the "local economic conditions" feature could be one-hot encoded with categories such as "population growth", "unemployment rates", and "strength of the local economy" assigned unique integer values. Alternately, real number values between 0-1 could be used to express a degree to which the particular subjective feature is present or absent.

Sentiment analysis is a natural language processing technique that is used to determine the sentiment of a text document. It can be used to analyze news articles, social media posts, and other text-based sources to extract sentiment-based features. For example, news articles that mention a particular municipal issuer could be analyzed to determine the sentiment of the article, which could be used as a feature in the machine learning model. Similar to sentiment analysis, expert opinions can be used to generate qualitative data that can be used as input for a machine learning model. For example, experts in the field of municipal finance could be asked to provide qualitative assessments of various features, such as the "management quality" or "political and regulatory environment" of a municipal bond issuer. These assessments could be converted into numerical data using a scale or rating system, such as a 1-10 scale.

A drawback of the three previous techniques is that they rely on some level of human/user interaction. Automated feature extraction techniques include text mining and principal component analysis. Text mining is a technique for extracting meaningful information from unstructured text data. It can be used to analyze financial reports, news articles, and other text-based sources to identify key phrases or concepts that are relevant to the creditworthiness of a municipal bond issuer. These key phrases or concepts can then be used as features in the machine learning model.

Text mining often involves performing a segmentation process on the unstructured data fields to identify the starting and ending boundaries of the text phrases and words. The text snippets are pre-processed by performing techniques such as, but not limited to, word frequency counting, dependency parsing, context tracing, and part-of-speech tagging. For example, word frequency counting identifies the most commonly occurring words and phrases in the unstructured text. Context tracing and part-of-speech tagging are used to identify the salient semantic-based words and phrases in the set of most commonly occurring words. Dependency parsing identifies the relationships between the words or phrases to determine the grammatical structure of a sentence. It is obvious to one of ordinary skill in the art that different articles may use different words or phrases to describe the same entity or concept, and the grammar or contextual arrangement in their sentences may differ. Thus, in some embodiments, unsupervised learning on the extracted set of words and phrases is performed to find the associations, relations, and normalizations within the set of words and phrases. Often, an ontology is used to define a set of reference concepts to be extracted from the unstructured text using text mining.

Principal component analysis is a statistical technique that can be used to identify underlying patterns in a set of variables. It can be used to reduce the dimensionality of a dataset by identifying the most important variables and combining them into new variables, known as principal components. This technique can be used to identify the most important qualitative features from a large set of potential features and convert them into quantitative inputs for the machine learning model.

In step 420, one or more of the above-discussed techniques is used to convert a plurality of subjective features, such as local economic conditions, political and regulatory environment, management quality, environmental, social, and governance (ESG) factors, and industry trends into numerical features for training a machine learning model.

In step 430, the numerical features, obtained from the subjective features, are combined with various quantitative features, conventionally used for credit rating by CRAs, to form feature vectors that can be used to train a machine learning model. Obtaining ground truth data for training a machine learning model to generate a rating for municipal issuers can be challenging, as credit rating agencies generally do not release the complete amount of underlying data or fully disclose the methodologies they use to generate municipal ratings. However, there are several approaches that can be used to obtain ground truth data for training a machine learning model:

One approach is to use historical data on municipal bond defaults or credit events to train the machine learning model. This data can be obtained from publicly available sources such as the Municipal Securities Rulemaking Board's Electronic Municipal Market Access (EMMA) system or from commercial data providers such as Moody's Analytics or S&P Global Ratings. The model can be trained on historical data to identify patterns and relationships between qualitative and quantitative features and the likelihood of credit events. Further, expert opinions can be used to generate ground truth data for training a machine learning model. Experts in the field of municipal finance can be asked to rate the creditworthiness of a sample of municipal bonds based on a set of qualitative and quantitative features. These ratings can be used as ground truth data to train the machine learning model.

If expert data or historical data is unavailable, sparse, or expensive to generate, simulations can be used to generate ground truth data for training a machine learning model. A simulation could involve generating a sample of synthetic municipal bonds with known default probabilities based on various qualitative and quantitative features. The model can then be trained on this synthetic data to identify patterns and relationships between features and credit risk.

Another approach is to compare the machine learning model's default probability analyses and conclusions to external benchmarks such as default probabilities reflected in the credit ratings provided by established credit rating agencies. This can be done using a holdout set of municipal bonds for which both the machine learning model and credit rating agencies have provided ratings. The model's ratings can be compared to the credit rating agencies' ratings to assess its accuracy and refine its features and methodology. Obtaining ground truth data for training a machine learning model to generate a rating for a municipal bond requires careful consideration of available data sources and the most appropriate methodology for the specific use case. It may also require ongoing refinement and validation as the model is developed and deployed.

Once the feature vectors and ground truth is ready, in step 440, one or more machine learning models are trained by providing the feature vectors as training data to the machine learning models. In some embodiments, the machine learning model is a neural network model and the feature vectors are provided as inputs to the neural network model. Different neural network models, have different numbers of hidden layers and intermediate neurons could be trained to see which network structure provides optimal predictive power. The neural network models try to mimic the data they are given, and use the error between the ground truth and their output to correct themselves (that is, correct the weights and biases for each connected pair of neurons) by adjusting their parameters as more data is input.

In some embodiments, validation and testing of the machine learning models is performed in step 450 to ensure that the models are generalized (they are not overfitted to the training data and can provided similar performance on new data as on the training data). In some embodiments, a portion of the feature vectors is held back from the training set for validation and testing. The validation dataset is used to estimate the neural network's performance while tuning the neural network's parameters (weights and biases). The test dataset is used to give an unbiased estimate of the performance of the final tuned neural network model. It is well known that evaluating the learned neural network model using the training set would result in a biased score as the trained model is, by design, built to learn the biases in the training set. Thus, to evaluate the performance of a trained machine learning model, one needs to use data that has not been used for training.

In one embodiment, the feature vectors can be divided equally between the training set and the testing set. The neural network models are trained using the training set and their performance is evaluated using the testing set. The best performing neural network model may be selected for use. The neural network model is considered to be generalized or well-trained if its performance on the testing set is within a desired range (error) of the performance on the training set. If the performance on the test set is worse than the training set (the difference in error between the training set and the testing set is greater than a predefined threshold), a two-stage validation and testing approach may be used.

In some embodiments, in a two stage validation and testing approach, the feature vectors are divided between the training set, the validation set, and the testing set. The neural network models are first trained using the training set, then their parameters are adjusted to improve their generalization using the validation set, and, finally, the trained neural network models are tested using the testing set.

In some embodiments, the feature vectors may be divided equally between the desired training, validation, or testing sets. This works well when there is a large collection of data to draw from. In cases where the collection of data samples is limited, other well known techniques, such as leave one out cross validation and testing or k-fold cross validation may be used to perform validation and testing. Cross-validation is a resampling procedure used to evaluate machine learning models on a limited data sample. The procedure has a single parameter called k that refers to the number of groups that a given data set is to be split into. As such, the procedure is often called k-fold cross-validation. When a specific value for k is chosen, such as k=10, the procedure becomes 10-fold cross-validation.

Cross-validation is primarily used to estimate how the trained model is expected to perform in general when used to make predictions on data not used during the training of the model. The dataset is shuffled randomly and divided into a predefined number (k) of groups. The training and testing process is performed k times, with one of the groups of data being held out as the testing set for each iteration and the remaining k−1 groups being used as the training set. Each model is fitted (trained) on the training set and evaluated (tested) on the test set to determine the level of generalization of the trained models.

Often, the purpose of k-fold cross validation may not be to pick one of the trained models as the final machine learning model but, rather, to help determine the model structure and the parameter training process for the machine learning model. For example, a neural network model can have one or more "hidden" layers of neurons between the input layer and the output layer. Further, different neural network models can be built with different numbers of neurons in the hidden layers and the output layers. In some embodiments, in the training phase, a plurality of neural network models having different numbers of layers and different numbers of neurons in each layer are generated. Each of the plurality of neural network models is trained using k-fold cross validation, and an error between the ground truth data and the output from each of the plurality of neural network models is calculated. The model (number of layers and number of neurons in each layer) having the lowest error is selected and then trained on the entire data set of feature vectors to generate the final machine learning model.

It is obvious to one of ordinary skill in the art that the machine learning model is not limited to neural networks and other machine learning models, such as a Markov random field network, support vector machine, random forest of decision trees, or k-nearest neighbor, or a combination of different types of machine learning models may be used.

In some embodiments, the number of financial assets in different portfolios of financial assets can vary greatly. This poses a challenge for training a machine learning model, such as a neural network, which has a fixed number of neurons for each layer including the input layer. In conventional machine learning models, padding is used to fix a maximum number of inputs that the model can handle. For missing inputs, the data is "padded" with a constant value (often 0) or a special marker. While padding ensures a consistent input size for the model, it has several drawbacks. One major problem with padding is the introduction of artificial data. Padding values do not reflect the true distribution of the actual data, potentially misleading the model during training. This can hinder the model's ability to learn accurate patterns from the real information present. Further, padding increases the computational burden. The augmented input size leads to more operations during training and inference, especially for models with a large number of parameters. This can become a significant factor for computationally expensive tasks. Choosing the appropriate padding length presents another challenge. Excessive padding wastes computational resources, while insufficient padding truncates valuable information from longer sequences of data. This adds an extra layer of complexity to hyperparameter tuning, requiring careful consideration to optimize model performance. In some cases, the impact of padding can extend beyond computational cost. Padding can introduce noise into the data, disrupting the natural relationships and characteristics inherent to the original sequences. This can make it more difficult for the model to capture the true underlying patterns within the data, potentially leading to suboptimal performance. Finally, padding increases the memory footprint of the data. This poses a limitation when dealing with large datasets or limited computational resources. The additional memory required to store the padded data can become a bottleneck for training and deploying the model.

Figure 5:
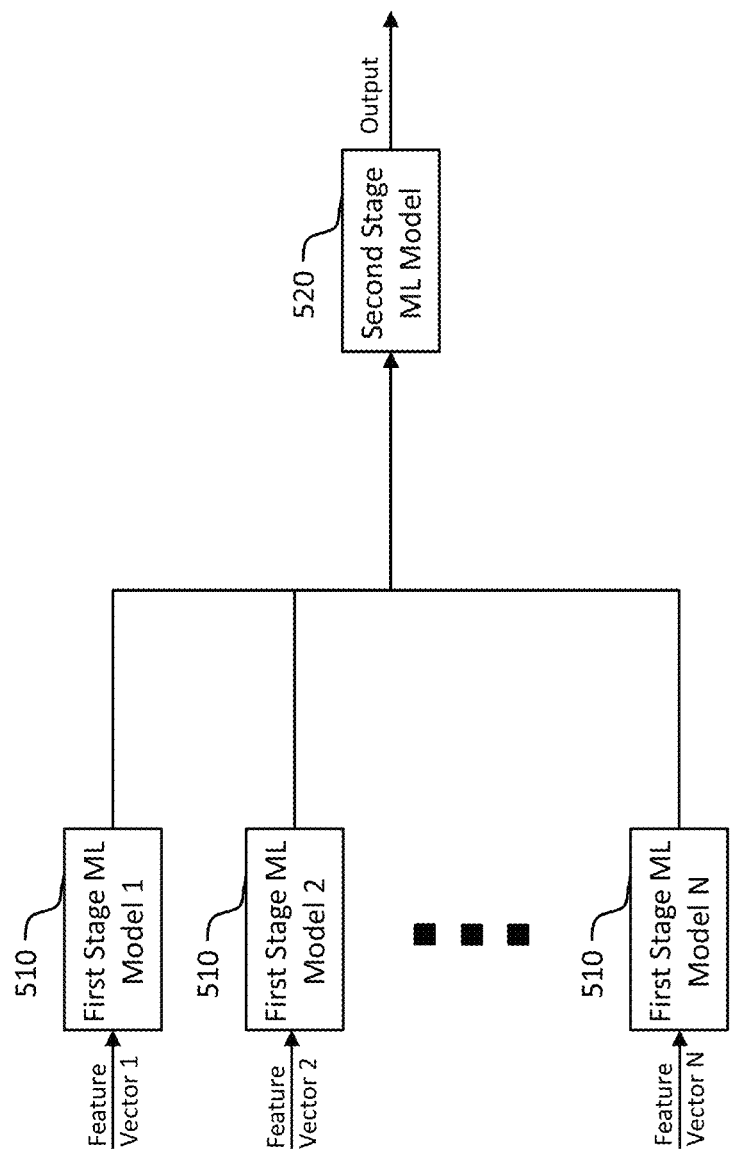
FIG. 5 shows a block diagram of a two-stage machine learning model, according to some embodiments of the present invention.

FIG. 5 shows a block diagram of a two-stage machine learning model, that can learn from training data with variable number of inputs for each sample, according to some embodiments of the invention. The two-stage machine learning model includes a plurality of first stage ML models 510 and one second stage ML model 520. The number of first stage ML models 510 depends on the number of financial assets in a portfolio of financial assets. For example, if the portfolio of financial assets includes 15 different assets, 15 instances of the first stage ML models 510 are used. Each of the first stage ML models 510 is identical. The only difference is that each first stage ML model 510 takes the features associated with one of the assets as input, and generates a corresponding output for that asset. The output could be a single value, such as a rating score for that asset, or it could be a multi value encoding of the information in the corresponding input features. The outputs from each of the first stage ML models is combined and input into the second stage ML model 520, which then generates the relative default probability for the portfolio of financial assets.

In some embodiments of the invention, the second stage ML model 520 includes a statistical model that generates, as an intermediate step, a fixed length input feature vector from the plurality of output vectors generated by the first stage ML models 510. In the simplest case, for example, an averaging operation can be used to average the feature values across the output vectors from the first stage ML models 520. In other embodiments, different machine learning models, such as recurrent neural networks (RNNs), support vector machines (SVMs), k-nearest neighbors (KNN), or probabilistic graphical models (PGMs) are used for the second stage ML model 520. RNNs are a natural fit for this task because they are specifically designed to handle sequential data. By feeding the model's output from the previous sample as an additional input for the next sample, the model can learn to refine its output based on the history. LSTMs (Long Short-Term Memory) and GRUs (Gated Recurrent Units) are special RNN architectures particularly adept at handling long-term dependencies, making them well-suited for recursive refinement. While SVMs typically work with fixed-size feature vectors, kernel functions like the sequence kernel or spectrum kernel, can transform the variable length data into a suitable format for the SVM. KNNs inherently handle variable data in that each sample is mapped to the feature space, and a distance metric is used to classify the samples based on their similarity to their neighbors. PGMs use Bayesian inference to update probabilities based on new evidence. The model's initial output, on the first asset, and subsequent information for the remaining assets, is used to update the model's posterior probability distribution of the rating indicator, effectively refining the output over time.

In some embodiments, different weights or biases can be applied to different features based on the importance of each feature in determining the relative risk of default by the municipal issuer. Determining the most important features in predicting the relative risk of default by a municipality can vary depending on the specific context. However, there are several key features that are commonly used in credit risk analysis and have been shown to be important predictors of the relative default risk for municipalities. These include debt ratios, fiscal health indicators, economic and demographic factors, legal and political factors, and bond-specific factors.

Debt ratios, such as the debt-to-GDP ratio in the case of sovereign credits, or the debt service coverage ratio, are important indicators of a municipality's ability to service its debt obligations. High debt ratios can indicate that a municipality is overleveraged and may be at increased risk of default. Fiscal health indicators, such as the municipality's revenue trends, expenditure patterns, and reserve levels, can provide insights into its financial strength and ability to weather economic shocks. Municipalities with weaker fiscal health indicators may be at increased risk of default. Economic and demographic factors, such as population growth, unemployment rates, and economic diversification, can impact a municipality's ability to generate revenue and service its debt obligations. Municipalities in economically disadvantaged areas may be at higher risk of default. Legal and political factors, such as the municipality's legal structure, political stability, and regulatory environment, can impact its ability to manage its finances and service its debt obligations. Municipalities facing legal or political challenges may be at increased risk of default. Bond-specific factors, such as the bond's maturity, interest rate, and credit rating, can impact its risk of default.

In contrast to municipal issuers, corporations issue securities to fund their business operations. Some of the features that are typically less important for rating municipal issuers in comparison to commercial issuers include profitability, industry-specific factors, market conditions, and stock performance.

Commercial bonds and securities are typically issued by corporations that are seeking to generate profits, so their profitability is a key factor in assessing creditworthiness. Earnings per share (EPS) is a key metric used to evaluate the profitability of corporations, and is therefore an important factor in assessing credit risk for commercial issuers. Municipalities, on the other hand, are typically not focused on generating profits, so profitability is less important for assessing their credit risk. Commercial bonds and securities may be issued by corporations in a wide range of industries, each of which may have unique characteristics that impact their creditworthiness. Municipal bonds and credits, on the other hand, are issued by governments to fund public projects, so industry-specific factors are less relevant. Commercial bonds and securities may be impacted by market conditions such as interest rates, inflation, and changes in supply and demand. While municipal issuers can also be impacted by market conditions, they are generally considered to be less sensitive to market fluctuations than commercial bonds and securities. Commercial bonds and securities may be impacted by the performance of the issuing corporation's stock, as well as broader market trends. Municipal issuers are not affected by stock performance, and are generally considered to be a safer investment than stocks.

The training algorithm can account for these differences between evaluating risk for commercial issuers versus municipalities by (1) filtering the feature vector to remove factors that are not important for the type of debt, bond, or credit being evaluated, or (2) by assigning additional weights to each factor, corresponding to their importance, or (3) using a combination of both filtering and weighting of factors.

A key element to the training algorithm and a core of the described ML model ((MUseQ®'s) proprietary analytics is the unification of a corporation's cash flow priorities within its vertical cash flow waterfall wherein that corporation must pay all amounts due, in terms of taxes, fees, and charges, to the municipal jurisdictions (issuers) within which they operate before corporate revenues can be used to pay holders of the corporation's debt.

For instance, Delta Airlines cannot generate revenues to pay bond holders until they first pay landing rights and gate fees to municipal owned airports who themselves issue bonds to investors to develop the airport's infrastructure. The municipal airport's priority within the airlines cash flow waterfall is higher than that of even the airline's senior bond holders. This cash flow reality is not considered using current CRA metrics thus allowing the ML model (MUseQ®) described herein to reveal relative credit strength in new and meaningful ways.

In some embodiments of the system, the cash flow priorities of each corporation that generate revenue for a municipal jurisdiction or municipal security are represented as additional factors that are used as input features to the ML model. This approach permits the ML model to learn and objectively evaluate the default risk of securities issued within the municipal securities asset class while taking the cash flow priorities, often ignored by the CRAs, into account. In some embodiments, the output of the machine learning model, which represents the default risk of securities issued by a municipal jurisdiction based on the cash flow priorities, can be compared with the output from a conventional CRA model, which does not account for the cash flow priorities, to provide an objective ratio of the default risk of a municipal securities asset class to the default risk of another asset class. In some embodiments, this objective ratio can be represented by the Municipal Securities Equalization Quotient (MUseQ®), which can then be used to adjust the ratings generated by the conventional CRA model on the municipal securities asset class in ways that render the relative default risk of the asset class in a more integral and accurate manner.

The trained machine learning models provide a more objective analysis of an issuer's relative creditworthiness and risk of default. The trained machine learning model can evaluate not just an individual issuer but a pool of credits/obligations issued by one or more issuers. When rating a pool of credits, such as a portfolio of loans or securities, credit rating agencies use portfolio credit risk analysis to assess the creditworthiness of the entire pool of credits, rather than each individual credit. The first step in portfolio credit risk analysis is to identify the key characteristics of the pool of credits, such as the types of loans or securities included, the geographic location of the borrowers or issuers, and the industries represented. The credit rating agency then analyzes the performance of similar pools of credits in the past to identify patterns and potential sources of risk. These features can be used, as discussed in detail above, to train a machine learning model to estimate the likelihood of default for the pool of credits based on historical data, market trends, and other relevant factors. These models may include techniques such as Monte Carlo simulations, stress testing, and scenario analysis to account for the potential impact of different economic and market conditions on the pool of credits.

Once the model's performance is satisfactory, it can be deployed in production to rate new pools of municipal credits using MUseQ®. The model's performance should be monitored over time and the model should be updated using new training data to ensure that it continues to provide accurate and reliable ratings.

In some embodiments of the invention, a method of generating a rating indicator comprises acquiring a training data set including a plurality of training samples, each training sample of the plurality of training samples defining a portfolio of financial assets and including a plurality of input features and an output predictor of the performance of the portfolio of financial assets, the plurality of input features including one or more qualitative features and one or more first quantitative features; converting the one or more qualitative features into one or more second quantitative features; training a machine learning model using the one or more first quantitative features, the one or more second quantitative features, and the output predictor for each training sample; receiving a new portfolio of financial assets whose rating indicator is to be generated; generating a new plurality of input features for the new portfolio of financial assets, the new plurality of input features including one or more new qualitative features and one or more new first quantitative features; converting the one or more new qualitative features into one or more new second quantitative features; inputting the one or more new first quantitative features and the one or more new second quantitative features into the trained machine learning model to generate a new output predictor for the new portfolio of financial assets; and generating the rating indicator for the new portfolio of financial assets based at least on the generated new output predictor.

In some embodiments of the invention, the one or more first quantitative features and the one or more second quantitative features are combined into an input feature vector for training the machine learning model.

In some embodiments of the invention, each training sample includes a plurality of input feature vectors, each feature vector being associated with one financial asset of the portfolio of financial assets; the machine learning model is a two-stage model including a plurality of first stage models corresponding to the plurality of input feature vectors and one second stage model; each first stage model of the plurality of first stage models is trained using a corresponding input feature vector of the plurality of input feature vectors as input to generate one or more outputs; and the second stage model uses, as input, the one or more outputs from each of the first stage models and generates, as output, the output predictor for each training sample.

In some embodiments of the invention, the number of the plurality of first stage models in the two-stage model is variable and has a one-to-one correspondence to the number of financial assets in the portfolio of financial assets. In some embodiments of the invention, the number of inputs to the one second stage model in the two-stage model is variable and has a one-to-one correspondence to the number of financial assets in the portfolio of financial assets. In some embodiments of the invention, the two-stage model is a dynamic neural network model.

In some embodiments of the invention, the rating indicator defines a probability of a risk of default. In some embodiments of the invention, the rating indicator is a ratio of a probability of a risk of default of a municipal securities asset class to a risk of default of a comparable collateralized loan obligation asset class.

In some embodiments of the invention, the portfolio of financial assets includes both municipal financial assets and commercial financial assets.

In some embodiments of the invention, the method further includes iteratively changing one or more financial assets in the portfolio of financial assets, updating the new plurality of input features, and generating the rating indicator until a target rating indicator is obtained.

In some embodiments of the invention, a database processing system comprises an input-output device system communicatively connected to a display device system, a memory device system storing a program, and a data processing device system communicatively connected to the input-output device system and the memory device system, the data processing device system configured at least by the program at least to execute the methods of the various embodiments discussed above.

In some embodiments of the invention, a non-transitory computer-readable storage medium is configured to store a program that, when executed by a data processing device system, performs the methods of the various embodiments discussed above.

Subsets or combinations of various embodiments described above provide further embodiments.

These and other changes can be made to the invention in light of the above-detailed description and still fall within the scope of the present invention. In general, in the following claims, the terms used should not be construed to limit the invention to the specific embodiments disclosed in the specification.

The invention claimed is:

1. A method of generating a rating indicator, the method executed by a programmed data processing device system, the method comprising:
   acquiring, via the programmed data processing device system, a training data set including a plurality of training samples, each training sample of the plurality of training samples defining a portfolio of financial assets and including a plurality of input features and an output predictor of the performance of the portfolio of financial assets, the plurality of input features including one or more qualitative features and one or more first quantitative features;

converting, via the programmed data processing device system, the one or more qualitative features into one or more second quantitative features, wherein the converting includes performing text mining on the one or more qualitative features to segment unstructured text data in the one or more qualitative features into textual snippets, extract a set of reference concepts from the textual snippets, and generate the one or more second quantitative features corresponding to the set of reference concepts;

combining via the programmed data processing device system, the one or more first quantitative features and the one or more second quantitative features into a plurality of input feature vectors, each input feature vector of the plurality of input feature vectors being associated with one financial asset of the portfolio of financial assets, for training a neural network model that generates an output predictor for the portfolio of financial assets;

training, via the programmed data processing device system, the neural network model using the plurality of input feature vectors including the one or more first quantitative features, the one or more second quantitative features, and the output predictor, wherein the neural network model is a two-stage neural network model including a plurality of first stage neural network models corresponding to the plurality of input feature vectors and one second stage neural network model, wherein each first stage neural network model of the plurality of first stage neural network models is trained using a subset of the input feature vectors of the plurality of input feature vectors as input to generate one or more outputs, and wherein the second stage neural network model is trained using, as input, the one or more outputs from each of the first stage models and generates, as output, the output predictor;

receiving, via the programmed data processing device system, a new portfolio of financial assets whose rating indicator is to be generated;

generating, via the programmed data processing device system, a new plurality of input features for the new portfolio of financial assets, the new plurality of input features including one or more new qualitative features and one or more new first quantitative features;

converting, via the programmed data processing device system, the one or more new qualitative features into one or more new second quantitative features, wherein the converting includes performing text mining on the one or more new qualitative features to segment unstructured text data in the one or more new qualitative features into textual snippets, extract a new set of reference concepts from the textual snippets, and generate the one or more second quantitative features corresponding to the new set of reference concepts;

combining via the programmed data processing device system, the one or more new first quantitative features and the one or more new second quantitative features into a new plurality of input feature vectors, each new input feature vector of the new plurality of input feature vectors being associated with one financial asset of the new portfolio of financial assets;

inputting, via the programmed data processing device system, the new plurality of input feature vectors including the one or more new first quantitative features and the one or more new second quantitative features into the trained neural network model to generate a new output predictor for the new portfolio of financial assets; and generating, via the programmed data processing device system, the rating indicator for the new portfolio of financial assets based at least on the generated new output predictor.

2. The method according to claim 1, wherein the number of the plurality of first stage models in the two-stage model is variable and has a one-to-one correspondence to the number of financial assets in the portfolio of financial assets.

3. The method according to claim 1, wherein the number of inputs to the one second stage model in the two-stage model is variable and has a one-to-one correspondence to the number of financial assets in the portfolio of financial assets.

4. The method according to claim 1, wherein the two-stage model is a dynamic neural network model.

5. The method according to claim 1, wherein the rating indicator defines a probability of a risk of default.

6. The method according to claim 1, wherein the rating indicator is a ratio of a probability of a risk of default of a municipal securities asset class to a risk of default of a comparable collateralized loan obligation asset class.

7. The method according to claim 1, wherein the portfolio of financial assets includes both municipal financial assets and commercial financial assets.

8. The method according to claim 1, further including iteratively changing one or more financial assets in the portfolio of financial assets, updating the new plurality of input features, and generating the rating indicator until a target rating indicator is obtained.

9. A database processing system comprising:
an input-output device system communicatively connected to a display device system;
a memory device system storing a program; and
a data processing device system communicatively connected to the input-output device system and the memory device system, the data processing device system configured at least by the program at least to:
acquire a training data set including a plurality of training samples, each training sample of the plurality of training samples defining a portfolio of financial assets and including a plurality of input features and an output predictor of the performance of the portfolio of financial assets, the plurality of input features including one or more qualitative features and one or more first quantitative features;
convert the one or more qualitative features into one or more second quantitative features, wherein the converting includes performing text mining on the one or more qualitative features to segment unstructured text data in the one or more qualitative features into textual snippets, extract a set of reference concepts from the textual snippets, and generate the one or more second quantitative features corresponding to the set of reference concepts;
combine the one or more first quantitative features and the one or more second quantitative features into a plurality of input feature vectors, each input feature vector of the plurality of input feature vectors being associated with one financial asset of the portfolio of financial assets, for training a neural network model that generates an output predictor for the portfolio of financial assets;

train the neural network model using the plurality of input feature vectors including the one or more first quantitative features, the one or more second quantitative features, and the output predictor, wherein the neural network model is a two-stage neural network model including a plurality of first stage neural network models corresponding to the plurality of input feature vectors and one second stage neural network model, wherein each first stage neural network model of the plurality of first stage neural network models is trained using a subset of the input feature vectors of the plurality of input feature vectors as input to generate one or more outputs, and wherein the second stage neural network model is trained using, as input, the one or more outputs from each of the first stage models and generates, as output, the output predictor;

receive a new portfolio of financial assets whose rating indicator is to be generated;

generate a new plurality of input features for the new portfolio of financial assets, the new plurality of input features including one or more new qualitative features and one or more new first quantitative features;

convert the one or more new qualitative features into one or more new second quantitative features, wherein the converting includes performing text mining on the one or more new qualitative features to segment unstructured text data in the one or more new qualitative features into textual snippets, extract a new set of reference concepts from the textual snippets, and generate the one or more second quantitative features corresponding to the new set of reference concepts;

combine the one or more new first quantitative features and the one or more new second quantitative features into a new plurality of input feature vectors, each new input feature vector of the new plurality of input feature vectors being associated with one financial asset of the new portfolio of financial assets;

input the new plurality of input feature vectors including the one or more new first quantitative features and the one or more new second quantitative features into the trained neural network model to generate a new output predictor for the new portfolio of financial assets; and generate the rating indicator for the new portfolio of financial assets based at least on the generated new output predictor.

10. A non-transitory computer-readable storage medium configured to store a program that, when executed by a data processing device system, performs a method of generating a rating indicator, the method comprising:

acquiring, via the programmed data processing device system, a training data set including a plurality of training samples, each training sample of the plurality of training samples defining a portfolio of financial assets and including a plurality of input features and an output predictor of the performance of the portfolio of financial assets, the plurality of input features including one or more qualitative features and one or more first quantitative features;

converting, via the programmed data processing device system, the one or more qualitative features into one or more second quantitative features, wherein the converting includes performing text mining on the one or more qualitative features to segment unstructured text data in the one or more qualitative features into textual snippets, extract a set of reference concepts from the textual snippets, and generate the one or more second quantitative features corresponding to the set of reference concepts;

combining via the programmed data processing device system, the one or more first quantitative features and the one or more second quantitative features into a plurality of input feature vectors, each input feature vector of the plurality of input feature vectors being associated with one financial asset of the portfolio of financial assets, for training a neural network model that generates an output predictor for the portfolio of financial assets;

training, via the programmed data processing device system, the neural network model using the plurality of input feature vectors including the one or more first quantitative features, the one or more second quantitative features, and the output predictor, wherein the neural network model is a two-stage neural network model including a plurality of first stage neural network models corresponding to the plurality of input feature vectors and one second stage neural network model, wherein each first stage neural network model of the plurality of first stage neural network models is trained using a subset of the input feature vectors of the plurality of input feature vectors as input to generate one or more outputs, and wherein the second stage neural network model is trained using, as input, the one or more outputs from each of the first stage models and generates, as output, the output predictor;

receiving, via the programmed data processing device system, a new portfolio of financial assets whose rating indicator is to be generated;

generating, via the programmed data processing device system, a new plurality of input features for the new portfolio of financial assets, the new plurality of input features including one or more new qualitative features and one or more new first quantitative features;

converting, via the programmed data processing device system, the one or more new qualitative features into one or more new second quantitative features, wherein the converting includes performing text mining on the one or more new qualitative features to segment unstructured text data in the one or more new qualitative features into textual snippets, extract a new set of reference concepts from the textual snippets, and generate the one or more second quantitative features corresponding to the new set of reference concepts;

combining via the programmed data processing device system, the one or more new first quantitative features and the one or more new second quantitative features into a new plurality of input feature vectors, each new input feature vector of the new plurality of input feature vectors being associated with one financial asset of the new portfolio of financial assets;

inputting, via the programmed data processing device system, the new plurality of input feature vectors including the one or more new first quantitative features and the one or more new second quantitative features into the trained neural network model to generate a new output predictor for the new portfolio of financial assets; and generating, via the programmed data processing device system, the rating indicator for the new portfolio of financial assets based at least on the generated new output predictor.

\* \* \* \* \*